United States Patent
Zou et al.

(10) Patent No.: US 7,882,139 B2
(45) Date of Patent: Feb. 1, 2011

(54) CONTENT ORIENTED INDEX AND SEARCH METHOD AND SYSTEM

(75) Inventors: Shenglong Zou, Shenzhen (CN); Ming Xu, San Jose, CA (US)

(73) Assignee: Xunlei Networking Technologies, Ltd, Shenzhen (CN)

( * ) Notice: Subject to any disclaimer, the term of this patent is extended or adjusted under 35 U.S.C. 154(b) by 1659 days.

(21) Appl. No.: 10/955,008

(22) Filed: Sep. 28, 2004

(65) Prior Publication Data

US 2005/0086254 A1     Apr. 21, 2005

Related U.S. Application Data

(60) Provisional application No. 60/507,292, filed on Sep. 29, 2003.

(51) Int. Cl.
*G06F 17/30* (2006.01)

(52) U.S. Cl. .................. 707/798; 707/610; 707/640; 707/706; 707/713; 707/722; 707/736; 707/758; 707/791; 707/793; 707/797; 707/802; 707/822; 707/828; 382/115; 382/209; 382/220; 382/224; 705/54; 715/733; 715/808; 715/839; 715/854; 715/133

(58) Field of Classification Search .............. 707/3, 707/610, 640, 706, 713, 722, 736, 758, 791, 707/793, 797, 802, 822, 828, 999.101, 999.102, 707/999.103, 999.001, 999.107; 382/115, 382/209, 220, 224; 705/54; 715/733, 808, 715/839, 854, 133

See application file for complete search history.

(56) References Cited

U.S. PATENT DOCUMENTS

| | | | | |
|---|---|---|---|---|
| 5,903,892 | A | * | 5/1999 | Hoffert et al. .................. 707/10 |
| 6,021,409 | A | * | 2/2000 | Burrows .................... 707/102 |
| 6,119,124 | A | * | 9/2000 | Broder et al. ........... 707/103 R |
| 6,418,430 | B1 | * | 7/2002 | DeFazio et al. ............... 707/3 |
| 7,277,766 | B1 | * | 10/2007 | Khan et al. ................. 700/94 |
| 7,308,643 | B1 | * | 12/2007 | Zhu et al. ................... 715/206 |
| 2002/0002468 | A1 | * | 1/2002 | Spagna et al. ................ 705/1 |
| 2002/0055936 | A1 | * | 5/2002 | Cheng et al. ............. 707/104.1 |
| 2002/0136279 | A1 | * | 9/2002 | Al-Kazily et al. ........... 375/150 |
| 2002/0138440 | A1 | * | 9/2002 | Vaidyanathan et al. ........ 705/54 |
| 2002/0184333 | A1 | * | 12/2002 | Appelman .................. 709/217 |
| 2005/0027943 | A1 | * | 2/2005 | Steere et al. ................ 711/133 |

OTHER PUBLICATIONS

"System for detecting undesired alteration of software," IBM Technical Disclosure Bulletin, Apr. 1990, vol. 32, No. 11, paras. 1-4.

* cited by examiner

*Primary Examiner*—Syling Yen
(74) *Attorney, Agent, or Firm*—Finnegan, Henderson, Farabow, Garrett & Dunner, L.L.P.

(57) ABSTRACT

This present invention describes an innovative solution in the area of indexing and searching binary files including various binary files such as multimedia files, including image files, mp3 files and other audio/video files from the public Internet. The invention introduces a way to index binary files such as multimedia files according to their content signatures, which uniquely identify themselves, and search for related files by walking through a graph database constructed during the index phase. The present invention can be used in a search engine and a download engine, as well as with text based index and search technologies. As a result, such extended usage will broaden a multimedia file's context and increase relevant accuracy of the keywords describing the context.

15 Claims, 8 Drawing Sheets

US 7,882,139 B2

CONTENT ORIENTED INDEX AND SEARCH METHOD AND SYSTEM

RELATED APPLICATION

This application claims priority to U.S. Provisional Application Ser. No. 60/507,292 filed Sep. 29, 2003.

BACKGROUND OF THE INVENTION

1. Field of the Invention

The present invention relates to the indexing and searching of various files, and in particular, binary files such as executable files including software releases and patches, compressed files including RAR and ZIP files, multimedia files including digital images, mp3 files, and other audio and video files. The present invention also relates to the ranking of such files after they have been indexed and searched, as well as the way to search and retrieve them rapidly and reliably.

2. Description of Related Art

In today's increasingly complex technology world, methods used to index and search Internet content play an important role for many content-rich applications, such as generic Internet search engines or enterprise search engines.

In the context of a search engine, it usually consists of four core components: a spider, a parser or indexer, a query engine, and a Web interface. The spider, also called a robot or a Web crawler, is the heart of a Web-based search engine. It is an autonomous Web client, which automatically makes connections to Web servers and requests Web pages. The response is checked and if the request is successful, the Web pages are fetched and indexed. In the indexing phase, words from textual Web pages are saved along with other information like word locations into the index. The search engine index created is similar in concept to the index of a book. While a book index provides page references for a particular word, a search engine's index contains words along with references to the Web pages that contain those words. Once the keywords are indexed, a query engine can provide search on the Web pages that contains the keywords. Since there are a significant number of Web pages, which contain a particular keyword, it is also necessary to rank these Web pages according to some particular rules, for example, the number of references made from other Web pages. Lastly, a Web interface is used to browse the sorted list of matching Web pages. The design and layout of the Web interfaces is beyond the scope of this document.

In general, text Web search engines perform an incremental scan and analysis of the Web, extract key words, and generate substantial indexes that can be later searched in response to a user's query. Binary Web search engines are more complicated. As an example, image Web search engine is illustrated here. If key words can be manually added based upon the contents for each image, they can be indexed and searched similar to text Web pages. Therefore, image Web search engines are simplified to text based search engines. However, this requires considerable physical work to label images on the Web. Undoubtedly, it is not practical due to an explosively increasing large number of images on the Web.

In order to make the search process automatic, Web search engines typically label images utilizing their file name and alternate texts. However, this generally produces poor results. Most images on the Web do not have a reasonable file name to represent their content. In addition, file names are normally short and many of them have only numbers. They can not describe the content accurately and fairly. This further reduces the accuracy of search results. In addition, due to the international nature of the internet, images that are posted on the Web may be labeled and described in various languages, which further complicates the process of indexing and searching the correct image files.

Most of today's index and search technologies utilize text to realize index and search as described above. In addition, there are a few of them, which target image files, focusing on particular attributes of images, such as color, brightness, pattern of lines, etc. Such approach is generally described in the following references: Chad Carson, et al., Blobworld: A system for region-based image indexing and retrieval, the Third Int. Conf. on Visual Information Systems, June 1999; Anil K. Jain and Aditya Vailaya, Image retrieval using color and shape, Pattern Recognition, 29(8), 1996; and Michael Ortega, et al., Supporting Similarity Queries in MARS, ACM Multimedia 97. Even though this method may be an improvement of the text-only search methodology, it is still rather limiting in terms of the types of binary files it searches, and the parameters it uses to find the desired files. Furthermore, binary Web search engines may need to resolve the downloading issue as well, because binary files can be extremely large. However, few search methods provide the solution to this problem. Therefore, there is a strong need in the art to find an improved index and search method in order to locate and download the desired binary files which are not readily and accurately served using existing methods.

SUMMARY OF INVENTION

Content Oriented Index aNd Search (COINS) technology is introduced and described in the present invention. COINS introduces a way to index binary files such as multimedia files according to their signatures, which uniquely identify themselves, and search for related files by walking through a graph constructed during the index phase. In particular, COINS can be used to accurately identify multiple sources (in terms of URLs) of a unique content, which can be used to accelerate download speed. Lastly, COINS can also be used in conjunction with text based index and search technologies to implement a binary files search engine with URLs of binary files as search results instead of URLs of Web files.

The present invention provides a method and system for generating an index graph database of binary files, comprising the steps of obtaining a list of target binary files, with the associated primary file identification information thereof, calculating the content signature of the binary files using appropriate algorithm, and storing the content signature together with the associated file identification information of the files corresponding to the content signature, thus forming the index graph database for the binary files.

In one embodiment of the invention, the invention provides a method and system for further identifying keywords associated with a plurality of binary files, said plurality of binary files having the same file content signature, and combining said keywords into a single set of keywords, thus associating the file content signature with the single set of keywords.

In another aspect of the invention, the present invention also provide an additional method and system of generating a content signature for a file, comprising the steps of dividing the file into a plurality of sections of appropriate sizes, calculating the content signature of said section using an appropriate algorithm, thus obtaining a plurality of section content signatures, and generating the file content signature based upon the plurality of section content signatures.

In yet another aspect of the invention, the present invention provides a method and system for generating a content signature for a file, comprising the steps of dividing the file into a plurality of sections of appropriate sizes, taking a plurality of samples from each section, calculating the content signature of said each section by using the plurality of samples from said section using an appropriate algorithm, thus obtaining a plurality of section content signatures, and generating the file content signature based upon the plurality of section signatures.

In a preferred embodiment of the invention, the present invention provides a method and system where the content signature of the file is calculated based on the section signatures using an appropriate algorithm such as SHA-1, instead of linking the sections together.

In a further aspect of the invention, the present invention provides a method and system for searching for binary files on the internet, comprising the steps of receiving a search query comprising for a target binary file from an initiating source, locating a plurality of content signatures in an index graph database, said plurality of content signature being linked to a plurality of binary files and to a plurality of keywords and file identification information description said plurality of binary files, and presenting the initiating source with said plurality of binary files, said plurality of binary files being relevant to the search query.

In another aspect of the invention, the present invention provides a method and system for downloading a target binary file, comprising the steps of generating an index graph database containing file identification information for a plurality of binary files, and their corresponding file content signatures calculated with appropriate algorithm, receiving a download query for a target binary file from an initiating source, wherein said target binary file is found in the index graph database, linked to a corresponding content signature, and said corresponding content signature is linked to a plurality of binary file URIs having the same content signature, downloading a plurality portions of the target binary file from the plurality of file URIs, and integrating said plurality of portions of the target binary file at the initiating sources' machine to obtain the complete target binary file.

In a preferred embodiment of the invention, the present invention provide a method and system for verifying the integrity of the downloaded binary file, and in another preferred embodiment, the present invention provides a method and system for re-downloading and recovering erroneous portions of the downloaded target binary file.

BRIEF DESCRIPTION OF THE DRAWINGS

The accompanying drawings, which are incorporated in and constitute a part of the specification, illustrate an embodiment of the invention, and together with the description, explain the invention.

FIGS. 3-1, 3-2 and 3-3 are diagrams depicting an initial, first-level of a search process of walking through the Index Graph of the present invention;

FIGS. 4-1 and 4-2 are diagrams depicting an additional, next-level of the search process of walking through the Index Graph of the present invention;

DETAILED DESCRIPTION OF THE INVENTION

The following detailed description of the invention refers to the accompanying figures. The detailed description does not limit the invention. Instead, it merely serves to explain the invention.

System Architecture

Figure 1:
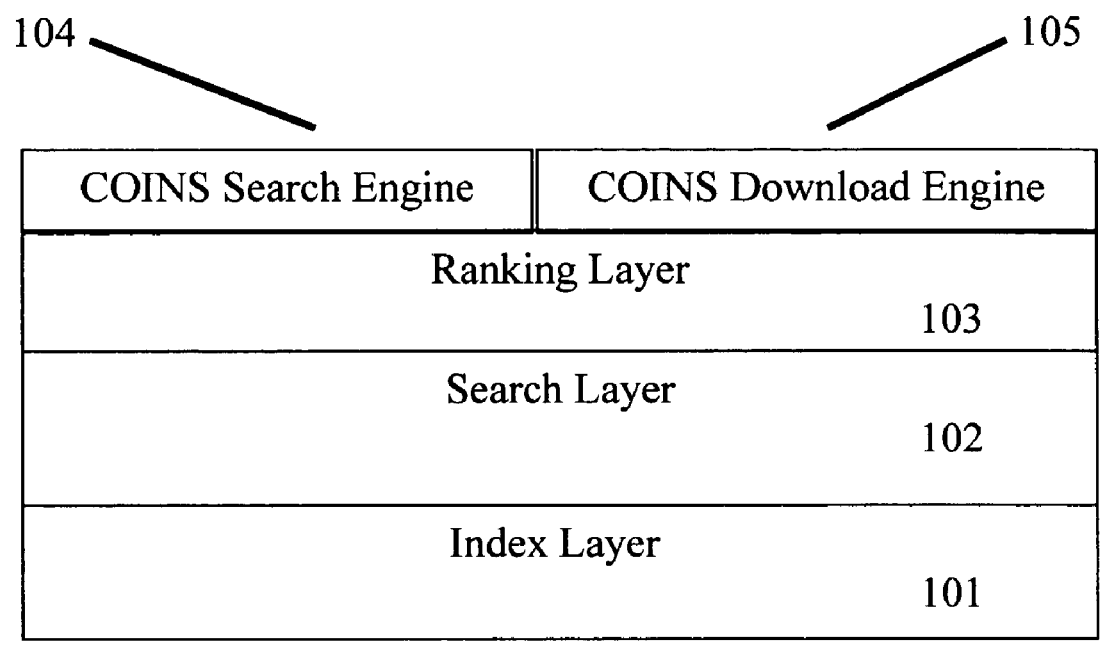
FIG. 1 is a diagram of the COINS system of four layers, which utilizes the index and search methodology of the present invention.

FIG. 1 is a diagram of the overall system, which consists of four layers: index layer 101, search layer 102, ranking layer 103, and applications layer, including a binary files search engine 104 and a download engine 105. Methods disclosed herein and set forth in the following discussion, may be performed by at least one processor (not shown) included in the system in accordance with instructions stored on a computer-readable medium. As used herein, the term "binary files" includes multimedia files, such as digital images, mp3 files, digital video files, and other audio and video files. It also encompasses other files such as executable files, and compressed files such as RAR files and Zip files. Index layer 101 is the bottom layer, where the Web pages fetched by the Spider program are analyzed, and the binary files' URLs and surrounding context text within the pages fetched are retrieved and indexed. Subsequently, an index graph and a context index map are constructed in this layer. The second layer is the search layer 102, which provides the service for both implicit and explicit search. COINS Search is the process of walking through the COINS index graph. The third layer, ranking layer 103, can rank the search results by weighed attributes and content relevance. Finally, the fourth layer includes two applications built upon COINS: COINS binary files search engine 104 and download engine 105.

COINS technology is an essential part of the present invention. It offers a model to index and search binary files such as executable files and multimedia files from Internet by content or digital signature. In this section, we first introduce content signature. Then we focus on discussing the architecture layout of the index layer, search layer and ranking layer. And finally, we explain the COINS multimedia files search engine and download engine.

Content Signature

Content Signature is used to identify the uniqueness of files in the COINS index. If two files, even stored under two rather different URLs, have an identical content signature, they are treated as same file. This is extremely important for searching and downloading binary files including various multimedia files, such as image, mp3 and audio/video from Internet. For instance, an image sometimes appears on different Web pages with different names with different alternate texts. However, traditional search engines may consider them as different images. The present invention can exactly identify them as the same image. Therefore, it could be used to improve the download speed as well as the accuracy and relevance of search results, hence the ranking, significantly.

The Content Signature Computing Algorithm

The actual algorithm used to calculate content signatures may vary on implementers' preference. The only note to take here is to use an algorithm that can guarantee the uniqueness on each such computation. The invention can take advantage of many algorithms to calculate the content signature, such as Davies-Meyer hash function. Here, as an example, the method of "secure content hash" can be used either in a direct way, or after customization, to calculate content signatures of binary files. This method can also be called "Secure Hash Algorithm" (SHA).

Secure Hash Algorithm, SHA-1, is used to compute a condensed representation of a message or a data file. When a message of any length $<2^{64}$ bits is input, the SHA-1 produces a 160-bit output called a message digest. The message digest can then, for example, be input to a signature algorithm, which generates or verifies the signature for the message.

The SHA-1 is called secure because it is computationally infeasible to find a message which corresponds to a given message digest, or to find two different messages which produce the same message digest.

For detailed computation introduction, please refer the Internet RFC 3174, which can be found at http://www.faqs.org/rfcs/rfc3174.html.

The Methods to Generate Content Signature

The binary files are generally large. Hence, it takes a lot of resources to generate the content signature and pass it back and forth to the servers if the entire file needs to be computed by the SHA-1 algorithms. An improved method is to divide the file for every 256K (or a different size) into N sections (the last one may not have 256K), and take samples from each section. As an example, the sample taken from a section can be the beginning portion of the section. It can also be the ending portion of the section. Sometimes, the sample can be a combination of the beginning portion and ending portion of the section.

After the samples are taken, the present invention can be used to compute a section content signature based upon the samples calculated by SHA-1 algorithms. The section content signature can be linked together to represent the signature of the source file. However, the drawback is that the signature is normally much longer (for example, a 1 GB file's signature would be 20 bytes*4000=80 KB, assuming each section ID is 20 bytes). Therefore, it collectively takes a lot of computing resources, including networking resource, CPU resources, and memory and storage resources, between the clients and the server for content signature related computation, such as those from the process of content signature's integrity check.

The present invention introduces a new method to reduce the required computation resource significantly without sacrificing the accuracy of the signature. Instead of linking section IDs together, the idea is to compute a signature based upon them, with SHA-1 algorithms again. This signature is then used as the content signature. It is advantageous to utilize this method is to increase efficiency in identifying the files to be searched or downloaded, and at the same time, reduce the size of the signature, and reduce the need for computing resources, especially for networking traffic.

COINS Index

COINS index consists of Uniform Resource Identifiers (URI) Index Graph and Context Index Map.

COINS URI Index Graph

The index graph contains several types of elements that are commonly used to describe and identify binary files, including Content Signature, Page URI, and File URI. The latter two elements are called Primary File Identification Information. In addition, there are other types of file identification information which may be associated with a binary file, including but not limited to surrounding context text, such as anchor text and description text, and attributes of File URI, such as file size, file protocol, etc. These are defined as Secondary File Identification Information. Together, the primary file identification information and the secondary file identification information are defined as file identification information.

In this document, the symbol (P) is used to represent Page URI, (F) to represent File URI and (C) to represent Content Signature. As the concept of "Uniform Resource Locator" (URL) is a subset of that of "URI", an example of Page URI is Page URL, and an example of File URI is File URL. The "many-to-many" mapping relationship exists between (P) and (F). The term "Many-to-Many" refers to the inter-linkage between multiple files to multiple pages, and vice versa.

In addition, the following conditions are defined:

Theory 1: Any two different (F)s refer to the same file if their corresponding (C)s are same.

Theory 2: Any (F) can be referenced from multiple (P)s, while any (P) can refer to multiple (F)s.

Index Concept: The output of the traditional index text based technologies is a list of keywords with references to the Web pages having the keyword. Differently, the outcome of COINS index practice is a three-dimensional graph containing (P), (F), and (C). (P) and (F) constitutes the main two-dimensional graph for search walk-through, while (C) lies in the third dimension with links from (F).

Ways to Index: A spider program scans Internet by analyzing a (P), which is discovered via seeding sites we feed and referenced from those seeding sites recursively. As it encounters the desired binary file with (F), it computes its (C). If a (P) contains a (F), it adds a link from the (P) to the (F). Similarly, if two files yield same (C), it adds two links to the (C) from both (F)s, although the file names and locations of both (F)s could be rather different. Hence, collectively, a 3-D index graph database is built, and the existence of the many-to-many relations are demonstrated in the database, as stated in the above defined conditions.

Figure 2:
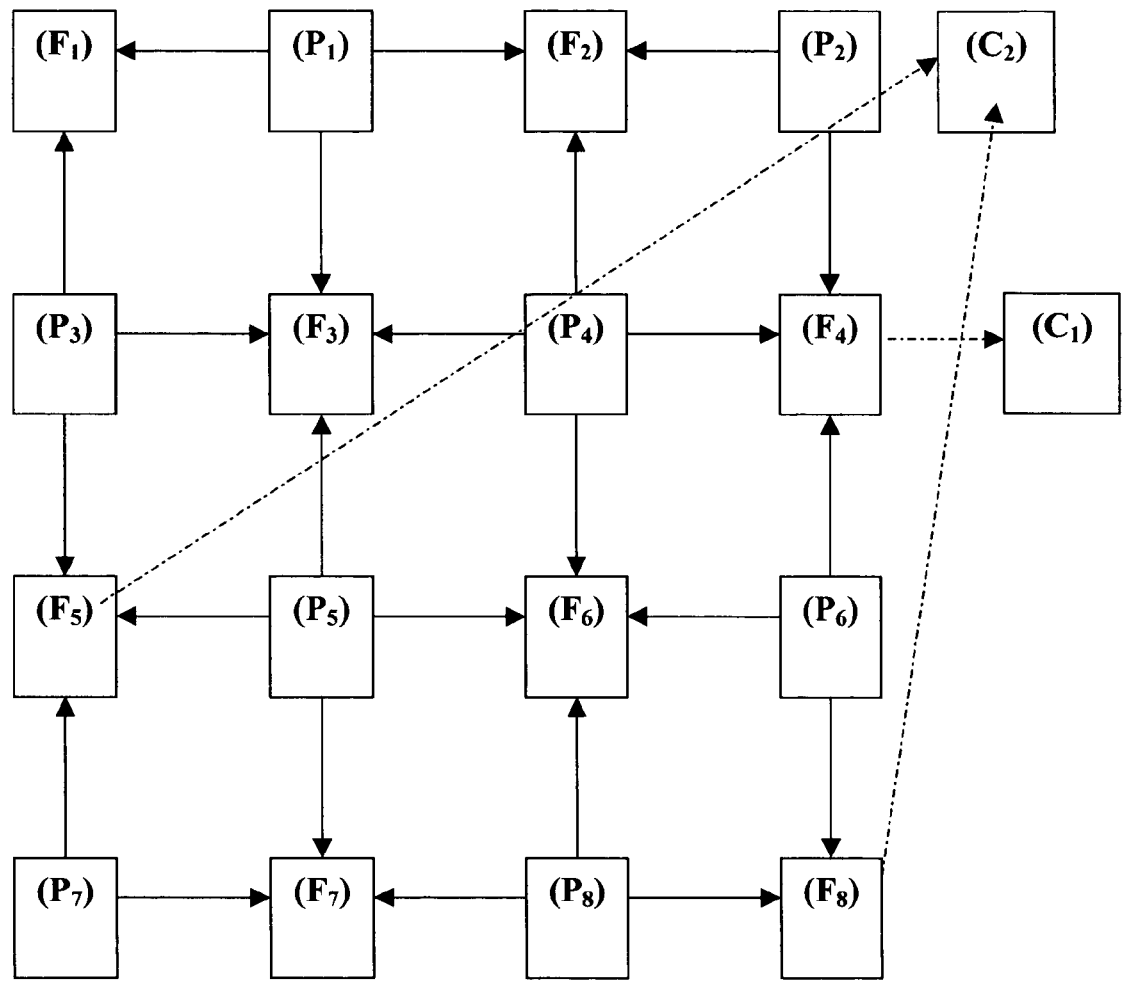
FIG. 2 is a diagram depicting an example of the Index Graph of the present invention, in particular, an instance of two multimedia files referred to the same content.

Graph Chart: After the index graph is built, it is important to understand how they are utilized in finding the desired binary file. FIG. 2 depicts a possible representation of the Index Graph. From the chart, it can be seen that a single (F) can be referred to by multiple (P)s. For example, $F_3$ is referred to by $P_1$, $P_3$, $P_4$ and $P_5$. Meanwhile, a collection of (F)s can come from a single (P), like $F_1$, $F_2$ and $F_3$ can come from $P_1$. Finally, the graph shows that there are two (F)s, $F_5$ and $F_8$, pointing to one $(C_2)$, which is located on the third-dimension. This indicates that the files located at $F_5$ and $F_8$ have the exactly same content. In other words, they are pointing to the same file.

Context Index Map

A context is a set of language dependent keywords to describe a file. For files with the same (C), their context can be merged or combined. Hence, it is possible to obtain a mapping between a list of (F)s with the same (C), and a set of collective keywords.

Furthermore, the occurrence count of keywords in a context is recorded. When two contexts are merged, their corresponding occurrence counts are added together for a given keyword, if it appears in both contexts. Therefore, the resulting set of keywords is looking like the following: $\{Keyword_1 * Count_1, \ldots, Keyword_i * Count_i\}$. Thus, it is possible to construct a list of mappings, and each of them looks similar to the following:

$$\{(F_1), \ldots, (F_i)\}) \rightarrow (C) \{Keyword_1 * Count_1, \ldots, Keyword_i * Count_i\}$$

After the above step, the process is reversed so as to generate a new mapping between each keyword and a list of (C)s, like the following:

$$Keyword_i \rightarrow \{(C_1) * Count_1, \ldots, (C_i) * Count_i\}$$

..., where each (C) still maps to a list of (F)

As a result, searching keyword "$Keyword_i$" yields a number of (C)s and each of the (C)s may be associated with a number of (F)s. More importantly, by walking through the Index Graph, more relevant (F)s can be found.

COINS Search

The search for binary files can be categorized into explicit and implicit search. Explicit search is triggered from a user interface by auto-generated keywords or keywords entered by end-users (much like search from traditional search engine). Implicit search is triggered by an event, for example, downloading a file from a download engine application. As used herein, a search query can be either a keyword, or a file URI. In both implicit search and explicit search, the search query can be a keyword, or a file URI.

Search Corollary: When explicitly or implicitly searching any (F) from Internet, conducting walk-through on the COINS Index Graph can produce a rather large search result. The results normally encapsulate various business logic embedded in (P). Such business logic may be a new released album for Ricky Martin or an mp3 top collection of Latin Male Singers.

Definition: COINS Search is the process of a graph-walking function in order to search for a particular binary file.

To start the process of searching, or walkthrough, either a depth first search (DFS) or breadth first search (BFS) can be undertaken over the graph through the walkthrough of the graph. DFS and BFS are powerful methods to explore a graph in a systematic way. Both methods start in a node (any node in the graph) v of a directed graph and visit all nodes that can be reached from v. The methods differ in the order in which they visit the nodes:

DFS first explores the edges out of the node most recently reached. In other words, it tries to go as deep as possible first.

BFS explores the edges in the order in which their source node is reached. It explores all edges out of the current node first and then goes to the next node.

Figures 1, 3:
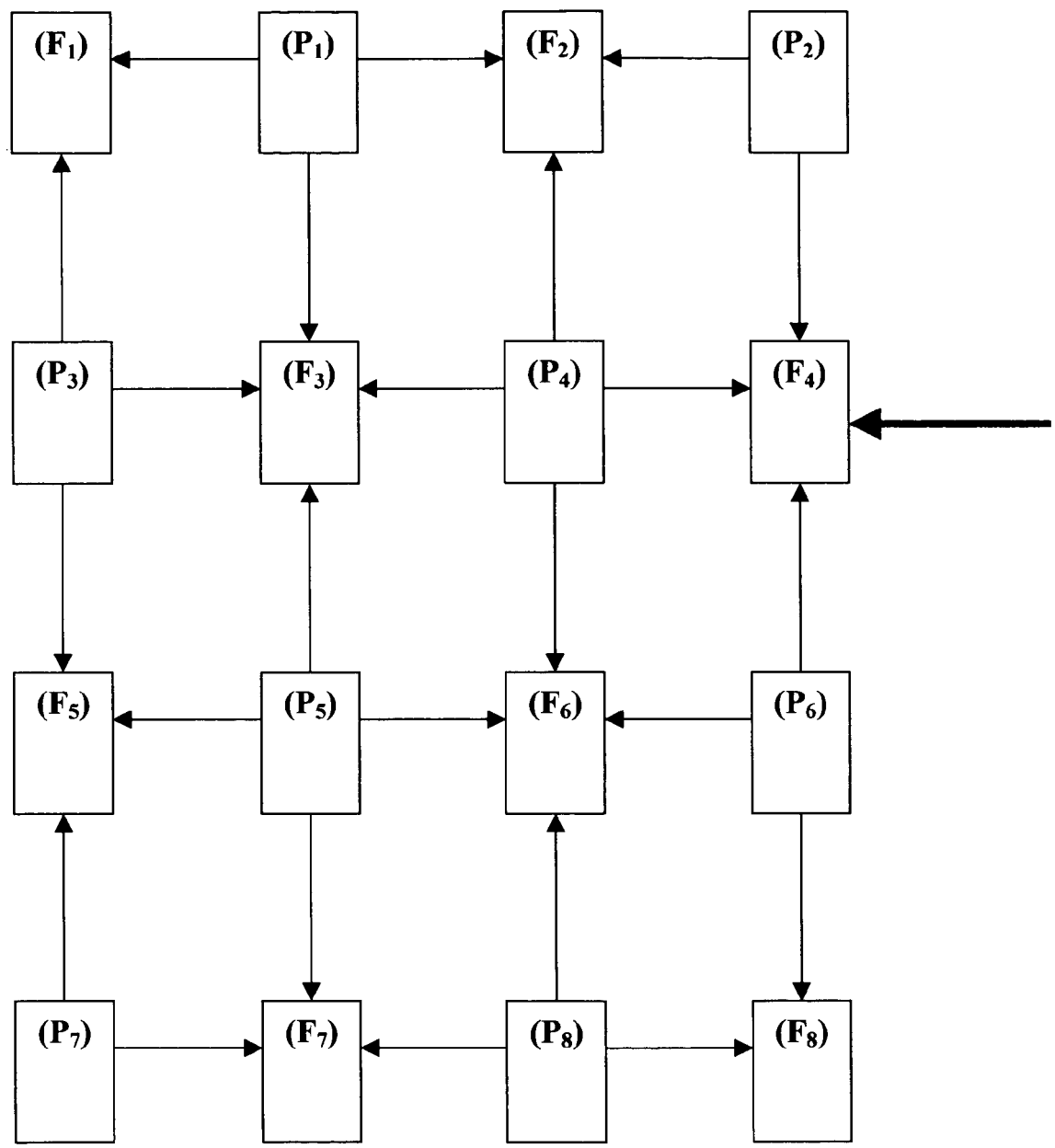
Figures 2, 3:
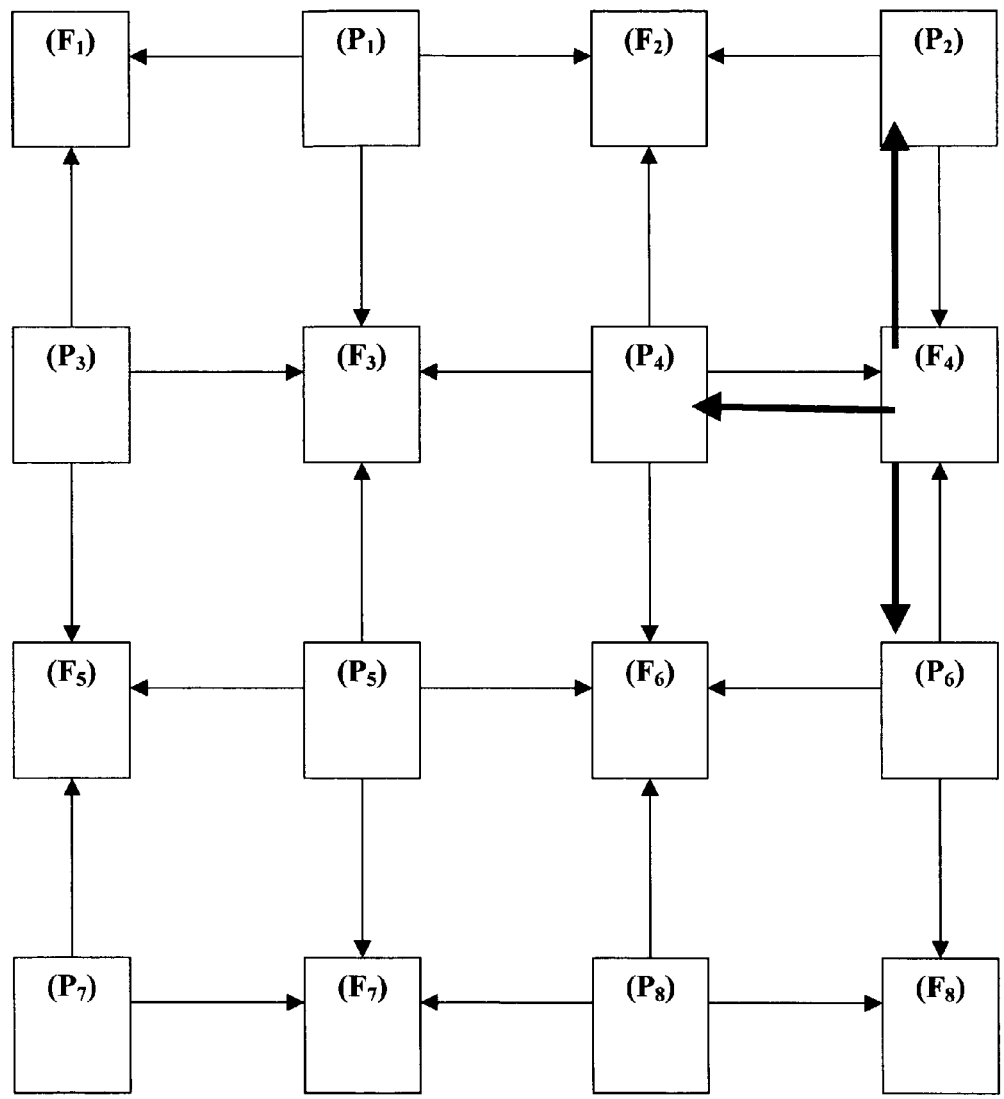
Figure 3:
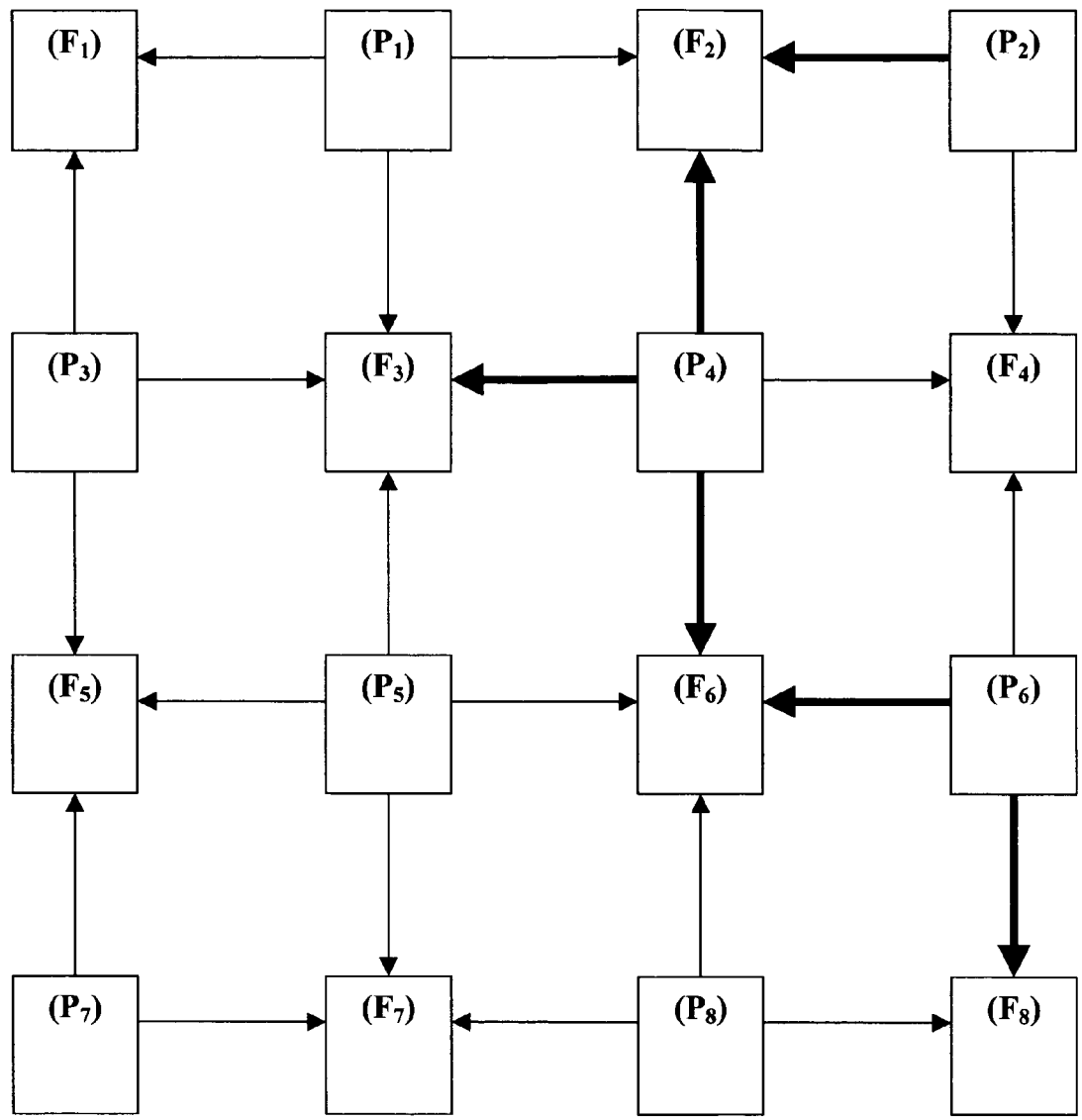

The walkthrough generates a list of (F)s. The steps of such walkthrough can be visualized as following:

1. A search request for a target binary file ($F_4$) comes into the system. Here, the search request can come from an initiating source such as an end user/client, a computer generated command from a downloading engine, or, by other appropriate means. To start the search process, we reverse-refer to three (P)s: ($P_2$), ($P_4$) and ($P_6$). As a result, we obtain additional four (F)s labeled as ($F_2$), ($F_3$), ($F_6$) and ($F_8$), by following references from the reverse-referred ($P_2$), ($P_4$) and ($P_6$). This is shown on FIG. 3-1, 3-2 and 3-3. In the first step, the depth of the set of (P)s is 1.

Figures 1, 4:
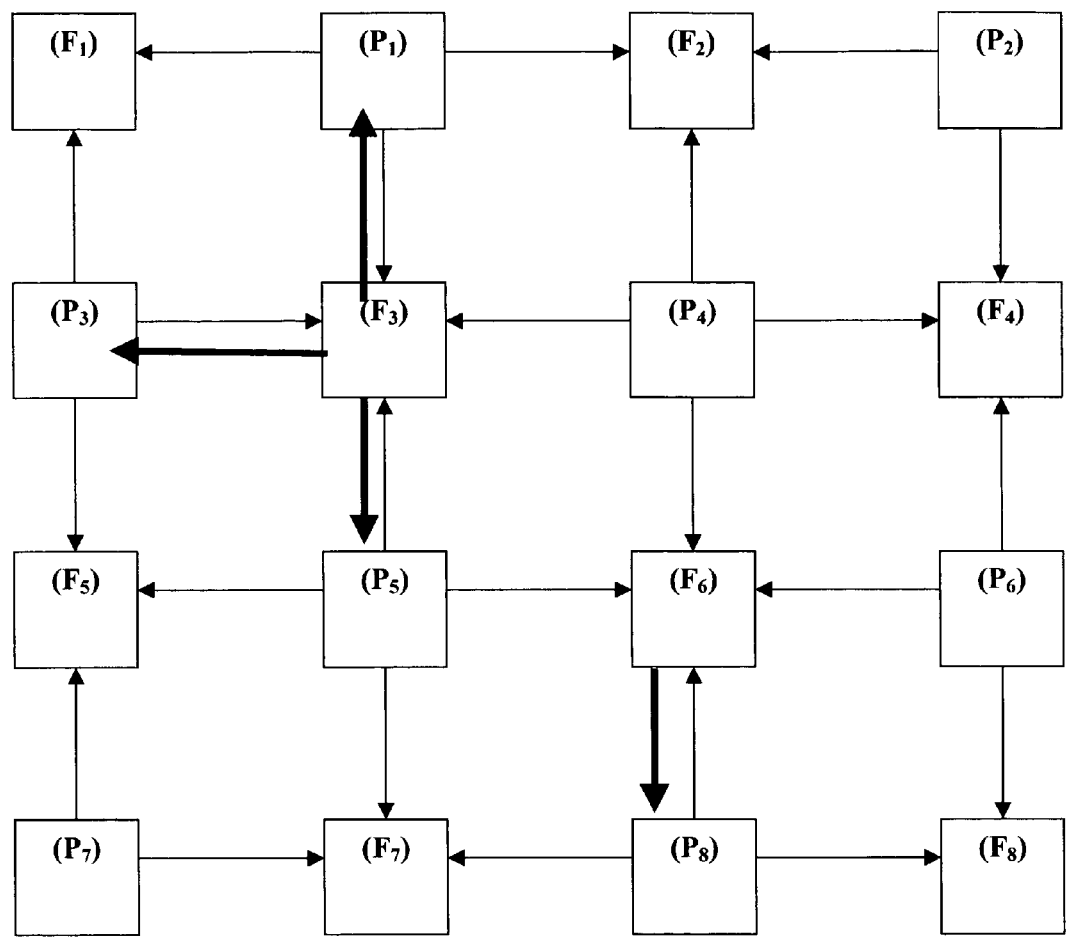
Figures 2, 4:
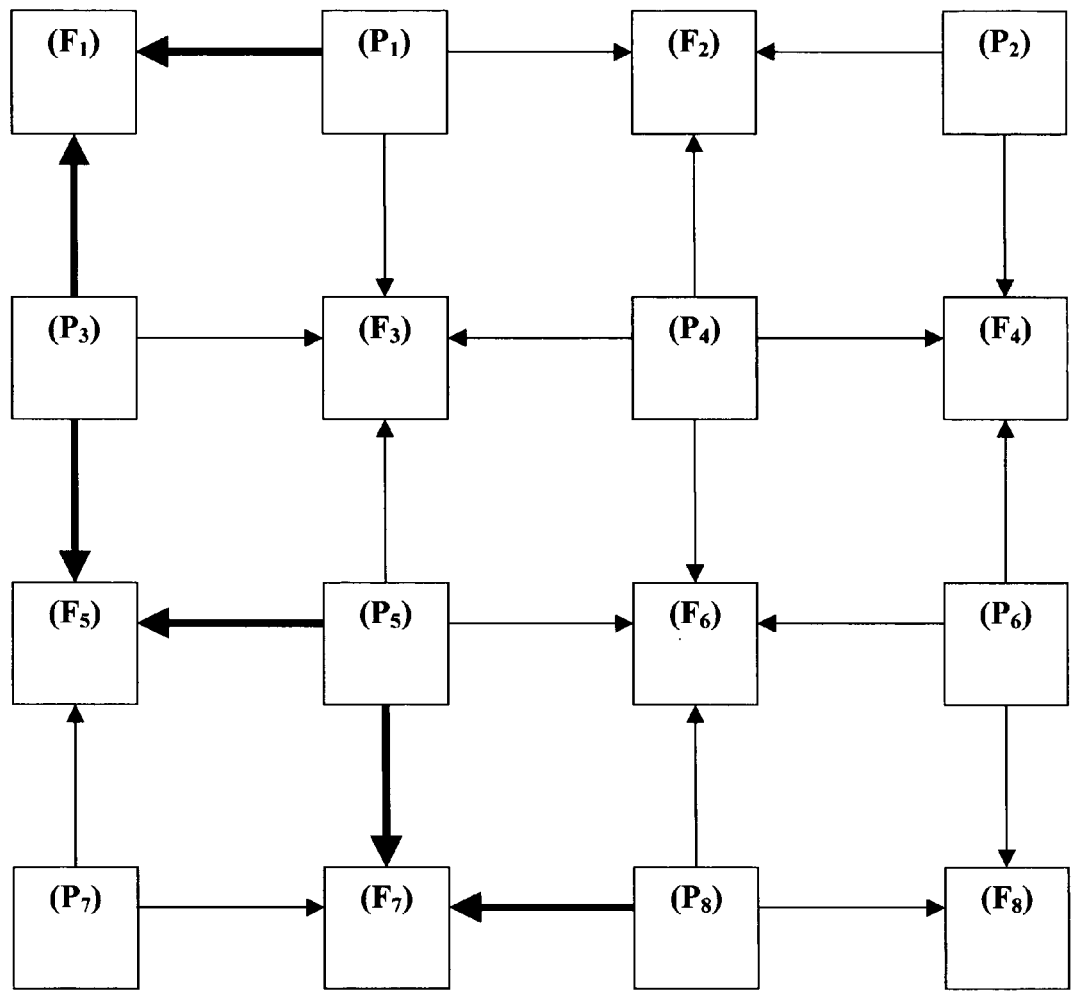

2. For each of the four (F)s obtained from the previous step, the same reverse lookup is conducted to obtain another set of (P)s: ($P_1$), ($P_3$) and ($P_5$). Then we can further obtain three more (F)s from that set: ($F_1$), ($F_5$) and ($F_7$). This is shown on FIGS. 4-1 and 4-2. In the second step, the depth of the set of (P)s is 2.

3. Recursively, the whole index graph can be walked through until a break condition is met. Such break conditions include, but not limited to:

The number of depth of such walkthrough

The total number of (F)s collected

The timeout of such walkthrough

The number of (P)s visited

4. Note, in order to avoid endless cycling of the graph walkthrough, it is possible to ignore references to the higher depth level entities. In other words, there will be no visit paid to ($P_2$), ($P_4$) and ($P_6$) in the step 2, because their depth is 1, and the walk through had already been conducted.

COINS Ranking

After the search process is completed, a set of binary files is presented to the end user. The presented binary files can include files that are identical to the target binary file, or not identical, but related to the target binary file through their shared common business logic, or other file attributes.

Often, the results delivered from the index and search process may need to be further ranked and sorted in order for the search result to be more useful. Thus, it is further desired as an embodiment of the present invention to evaluate, and rank the search result according to several object models.

Object Model: The following key information is to be captured in the object model, to enhance the ranking results, and to enable value-added business logics.

The object of (P) captures visit-count, reference count, real-time server or peer bandwidth, online status, and etc.

The object of (F) includes age of references, visit-count, sources, status of the sources (i.e. bandwidth, online, etc.), and etc.

Ranking of a List of (C)S, or Seeding (F)S by Weighed Attributes

The weighed attributes can be customized in various engines. Specially, in the download engine, the weighted attributes can be based on:

The file average downloading speed

The file downloading counts

The available resource counts

The file size.

Therefore, the (C) will get a higher ranking if it can be downloaded faster and if it is more popular.

Ranking of a List of (C)S, or Seeding (F)S by Content Relevance

Ranking of a list of (C)s by content relevance is primarily based on its associated keyword *Count* value. For example, we search with keywords "Hello World". In our context index map, we have:

"Hello"→{($C_1$)*50, ($C_2$)*25}

"World"→{($C_2$)*30, ($C_3$)*17}

Then, the resulting sorted set of (C) is {($C_2$), ($C_1$), ($C_3$)}, because the corresponding count of (C) set is {(25+30), 50, 17}.

Visit Count of (F)

As an initial matter, it is helpful to describe one of the ranking rules used here: visit count. The visit count refers to the total number of visit by end-users. However, if ($F_i$) and ($F_j$) refer to the same (C), then we consider the visit count of ($F_i$) or ($F_j$) to be the summation of Count($F_i$) and Count($F_j$).

Lastly, it is worthwhile to point out that such strategy can be applied to general search engine as well.

Ranking of a List of (F)s

Ranking of a list of (F)s is a function of weighed attributes of (F). For each (F) in the search result list, there is a ranking value can be computed. The ranking computation should be able to seize these facts:

1) The level of search depth: level(n) (F) is less closely-related compared with level (n−1) (F).

2) The reference count from its containing entities: The bigger the count, the more popular the (F), hence the more interested to end-users. In the case that over one (F)

maps to the same (C), the reference count of each of the (F)s is the summation of the reference count of all the (F)s. For example, if
a) $(F_1) \rightarrow (C)$ and $(F_2) \rightarrow (C)$, and
b) $RC((F_1))=10$ and $RC((F_2))=15$
c) Then, $FRC(F_1\|F_2)=RC((F_1))+RC((F_2))=25$
d) Similarly, if $(F_1) \rightarrow (C_1)$, $(F_2) \rightarrow (C_2)$, and $(C_1) <> (C_2)$, then, $FRC(F_1)=RC(F_1)$ and $FRC(F_2)=RC(F_2)$.

Where RC refers to the function of Reference Count, FRC refers to the function of Final Reference Count, and $(C_1) <> (C_2)$ means $C_1$ is not equal to C2.

3) The accumulative visit count from end-users: The more the visit count, the more popular the (F) is to end-users.
4) The type of (F): same type (may be different extension), i.e. musical files, means more relevance.
5) The visit count of its containing entities: the more the containing entity of (P) gets visited, the more popular the (F) is to the end-users.
6) Custom Hook: it offers an entry point for applications to enter application-dependent attributes.

Note, each of the attributes above has an associated co-efficient, which is subject to real-time tuning.

COINS Search Engine and Download Engine

It is further described that the COINS index and search method can be utilized in real world systems in both Internet searching and file downloading. Two methods and systems are described below which incorporate the process of COINS index and search. One is COINS-based search engine for binary content, while the other one is a download engine utilizing COINS to optimize rich content delivery.

Searching Engine on COINS

Binary Search Engine offers service to search binary files such as executable files and multimedia files not only from Internet but also from P$_2$SP network. As used herein, the term P2SP refers to Peer-to-Server-to Peer computing. In other words, as compared to other P2P network, P2SP network can include sever machines as well as peer machine. The following is a description how the COINSE search engine works and how various parts of COINS are utilized to construct such a search engine.

1) Prior to the search, the COINS index database consisting of URI Index Graph and Context Index Map is built through the Spider and end-users' daily usage.
2) During the search, the user input is analyzed based on keywords dividing strategies in order to generate a meaningful set of keywords.
3) For each keyword, search through the context map to retrieve a set of (C)s. The context map used in this step is the second mapping generated in the COINS index process:

Keyword$_i \rightarrow \{(C_1)^*Count_1, \ldots, (C_j)^*Count_j\}$

4) Sort the set of (C)s according to the *Count* information.
5) For each (C) got in the step 3, derive a set of seeding (F)s from the first mapping generated in the COINS index process:

$\{(F_1), \ldots, (F_j)\} \rightarrow (C) \rightarrow \{Keyword_1^*Count_1, \ldots, Keyword_j^*Count_j\}$ 6) Conduct a COINS search on the seeding (F)s got in the step 5 to obtain a set of final (F)s.

Download Engine on COINS

The download engine introduces the concept of the P2SP. If the content can be downloaded from multiple sources, it can significantly improve data retrieving speed (by acquiring portions of data from multiple computationally faster sources in parallel) and data access reliability (by avoiding busy and sometimes invalid links). The source can be either Internet server or peer machine, or both.

The key to make this work is to obtain a list of targeting Internet servers and peers for data retrieving. And this can be resolved by COINS.

Delivery Corollary: When trying to obtain any (F) from Internet, the underlining content delivery system can intelligently select alternative sources by COINS in addition to the original source to render the (F), since it is guaranteed that the content at these sources are identical. The guarantee is ensured by the identical content signature. Below is a description of how COINS download engine works:

1) The client software is installed on end-users' machines.
2) Prior to or during the download, the COINS URI Index Graph is built.
3) The client sends the download request for a target binary file to the server, which uses COINS to search for the sources of the content to be downloaded. A set of Internet servers and peers, in terms of URLs, having the exact rich content may be returned, although the URLs may have different Internet protocols, different paths, and different file names. During the COINS search in the index graph database, the target binary file is looked up in the index database. If the database already includes the file URI of the target binary file, then a content signature of the target binary file is linked to the search request. If the database does not contain the file URI of the target binary file, then content signature of the target binary file is calculated, and stored in the database. This content signature is used to link to other file URIs in the database which has the same content signature.
4) The client proceeds to download portions of the files from different sources in parallel, including different Internet servers as well as different peers. Upon successful download, the client integrates the portions of data into a single file.
5) The client performs file integrity verification by comparing the content signature computed from the data just downloaded with that stored on the server. If the content signatures are same, the download is over.
6) The client needs to efficiently identify corrupted sections, if a mismatch is indicated in the last step. One solution is to sequentially compare section IDs with those stored on the server. However, this method could be rather expensive for large files. For example, a 1 GB game file will have 4000 section IDs, thus 4000 section IDs comparison would result in 80K bandwidth consumption on the server, assuming each section is 256K and each section ID is 20 bytes. Instead, a computationally efficient method is described in the following paragraph, and it's called "The Limited Divide-and-Conquer Algorithms with Content Signature in Downloading Engine".

The algorithm divides the section IDs into two parts, A and B, and computes a signature from of each part, using the same content signature computation method. Then the signature A and B are compared between the client and the server. If signature A matches, it indicates part A is correctly downloaded. However, if it does not match, the part A will once again be divided into two parts, and the process is repeated.

The divide-and-conquer algorithms could also be expensive if the corrupted sections are a large number and they are randomly located in a file. Therefore, the present method sets up a maximum depth which it can travel. For example, a maximum 3 depth only requires 7 ID comparison and 140 bytes bandwidth consumption on the server, to locate any corrupted portion. In this case, each portion is ⅛ of the file.

7) The client seeks to download the corrupted portions, and their signatures need to be checked after downloading.

To better understand the download engine application, examine the following concrete scenario:

Suppose that after Red Hat Linux releases its 9.1 version OS, many content (mirror) sites manage to store a copy of the new release to serve its community. Meanwhile, a lot of Linux end-users start to seek (fast) download. The somewhat 100 MB download gets crazy for a couple of well-known sites, which results in deadly-busy servers, hence, world-wide-wait phenomena to their end-users.

Figure 5:
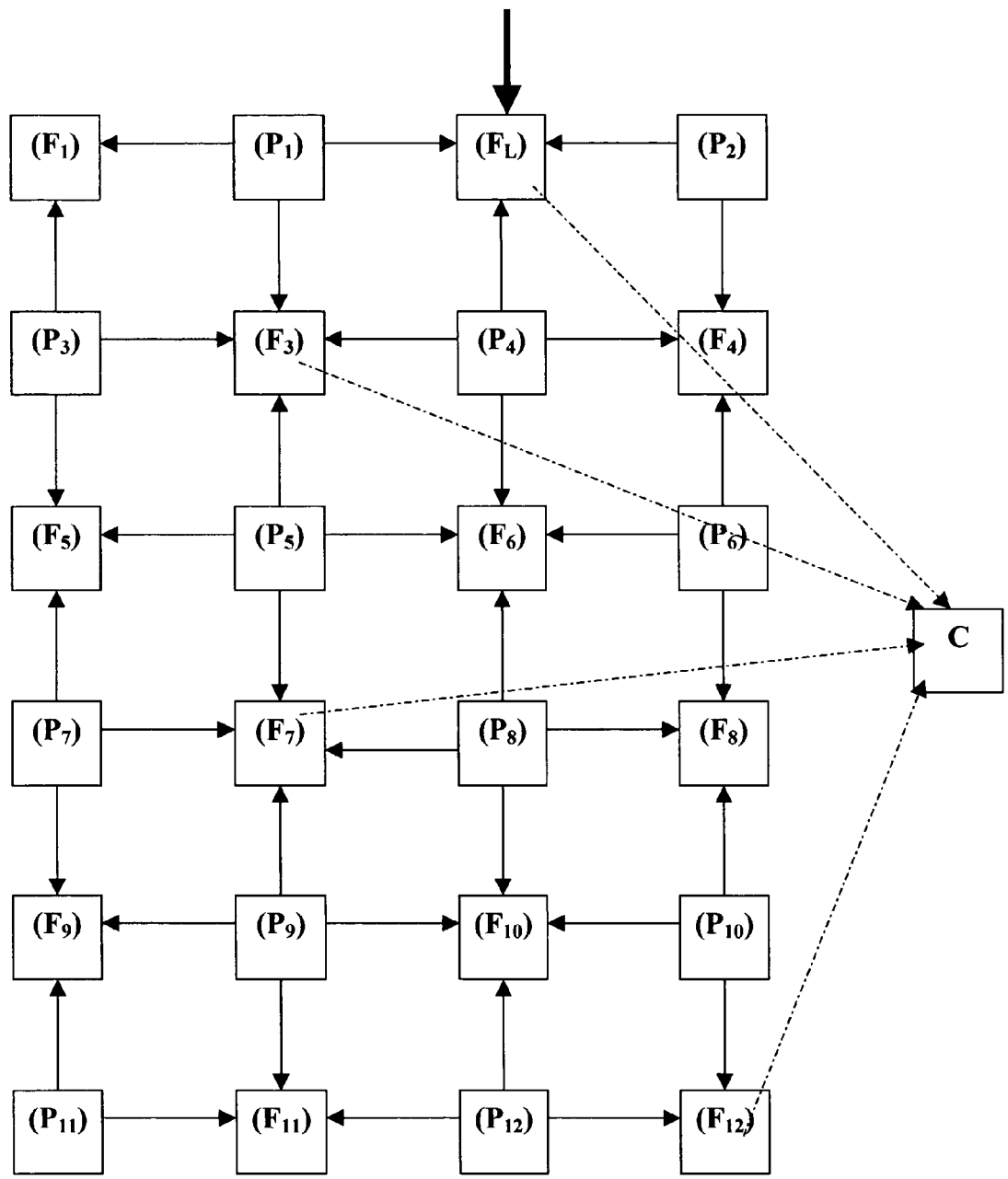
FIG. 5 is a diagram depicting an application of the index and search method of the present invention in the area of Peer-to-Server-and-Peer (P2SP) Content Delivery Network (CDN) download engine.

Take for example, the instance of the graph, built from scratch or a spider program, of FIG. 5, showing that the to-be-downloaded Linux new release, labeled as ($F_L$), are actually available from three server sources, labeled as ($F_L$), ($F_3$) and ($F_7$), and one peer sources, labeled as ($F_{12}$).

The actual format of sources can vary depending on the underlining implementation. Here, the server source is defined as: ($F_L$) is http://www.redhatlinux.com/releases/download/linux9-2-1.zip, ($F_3$) is ftp://218.105.114.254:3044/pub/software/top10/linux9-2-1.zip, and ($F_7$) is ftp://219.101.18.20/pub/linux/linux-latest.zip. Likewise, the peer source is defined as jxta://uri-334/linux-latest-9-2-1.zip.

Please note that the ($F_L$) and ($F_3$) have the same file name linux9-2-1.zip, while ($F_7$) and ($F_{12}$) have a different file name. However, since their content signatures are the same, they are pointing to the same file.

As a result, a download application built around this architecture could elect to retrieve portions of the newly released Linux OS software from more than one source. In fact, such download strategy transforms the bottleneck of server bandwidth to that of the downloading client. Moreover, in case of single point of server failure (due to busy server or bad connectivity to that failing server), the client can still obtain the software from other sources.

In short, the above depicted intelligent and automatic routing utilizes the Core Index Graph and the procedure is transparent to end-users. Needless to say, a global load-balancer of such can be built to effectively reduce the chance that any content server fails in face of unexpected or expected traffic surge.

All patents, publications, website contents, and other materials and documents referred to herein, whether in printed or electronic format, are hereby incorporated by reference.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims and their equivalents hereinafter appended.

What is claimed is:

1. A computer-implemented method of generating an index graph database of non-text binary files, comprising steps performed by a processor of:
receiving file identification information of a list of non-text binary files, the file identification information comprising a plurality of File Uniform Resource Identifiers (URIs), each File URI uniquely identifying a non-text binary file;
calculating content signatures for the non-text binary files, the content signatures being determined by the content of the corresponding non-text binary files;
identifying a plurality of distinct content signatures among the calculated content signatures;
forming the index graph database with the plurality of File URIs and the plurality of distinct content signatures;
for each distinct content signature, identifying a plurality of non-text binary files among the list of non-text binary files, the content signature of each identified non-text binary file being equal to the respective distinct content signature, and linking the respective distinct content signatures with the File URIs of the identified non-text binary files in the index graph database;
determining a weighted attribute for each distinct content signature based on at least one of an average downloading speed or a downloading count of the non-text binary files identified by the File URIs linked to the respective distinct content signature;
ranking the plurality of distinct content signatures according to the weighted attributes; and
ranking at least a subset of the plurality of File URIs according to the ranked distinct content signatures.

2. The method of claim 1, further comprising the steps of:
combining keywords associated with the non-text binary files linked with the distinct content signatures into a single set of keywords;
storing the single set of keywords in the index graph database; and
linking the respective distinct content signature with the single set of keywords.

3. The method of claim 2, further comprising the steps of:
determining occurrence counts of each keyword associated with the plurality of non-text binary files linked with a distinct content signature;
determining a single occurrence count for each keyword by combining the occurrence counts of the respective keyword; and
ranking the keywords within the single set of keywords, such that the keyword with the highest single occurrence count is associated with the respective distinct content signature first.

4. The method of claim 1, wherein the file identification information further comprises secondary file identification information.

5. The method of claim 4, wherein the file identification information further comprises Page URI.

6. The method of claim 4, wherein the secondary file identification information comprises anchor text, description text, file size, and file protocol.

7. The method of claim 5, wherein the Page URI is a Page URL, and the File URI is a File URL.

8. The method of claim 1, wherein the content signatures are calculated using an SHA-1 algorithm.

9. The method of claim 1, comprising storing the distinct content signatures and the linked File URIs on a plurality of computers.

10. The method of claim 9, wherein the plurality of computers comprise a central server computer and a client computer.

11. A computer system for generating an index graph database of binary files, comprising:
- means for receiving file identification information of a list of non-text binary files, the file identification information comprising a plurality of File Uniform Resource Identifiers (URIs), each File URI uniquely identifying a non-text binary file;
- means for calculating content signatures for the non-text binary files, the content signatures being determined by the content of the corresponding non-text binary files;
- means for identifying a plurality of distinct content signatures among the calculated content signatures;
- means for forming the index graph database with the plurality of File URIs and the plurality of distinct content signatures;
- means for identifying, for each distinct content signature, a plurality of non-text binary files among the list of non-text binary files, the content signature of each identified non-text binary file being equal to the respective distinct content signature, and linking the respective distinct content signatures with the File URIs of the identified non-text binary files;
- means for determining a weighted attribute for each distinct content signature based on at least one of an average downloading speed or a downloading count of the non-text binary files identified by the File URIs linked to the respective distinct content signature;
- means for ranking the plurality of content signatures according to the weighted attributes; and
- means for ranking at least a subset of the plurality of File URIs according to the ranked distinct content signatures.

12. The system of claim 11, further comprising:
- means for combining keywords associated with the non-text binary files linked with the distinct content signatures into a single set of key words;
- means for storing the single set of keywords in the index graph database; and
- means for linking the respective distinct content signature with the single set of keywords.

13. The system of claim 12, further comprising:
- means for determining occurrence counts of each keyword associated with the plurality of non-text binary files linked with a distinct content signature;
- means for determining a single occurrence count for each keyword by combining the occurrence counts of the respective keyword; and
- means for ranking the keywords within the single set of keywords, such that the keyword with the highest single occurrence count is associated with the respective distinct content signature first.

14. A computer-readable medium having stored thereon instructions for causing at least one processor to perform the following:
- receiving file identification information of a list of non-text binary files, the file identification information comprising a plurality of File Uniform Resource Identifiers (URIs), each File URI uniquely identifying a non-text binary file;
- calculating content signatures for the non-text binary files, the content signatures being determined by the content of the corresponding non-text binary files;
- identifying a plurality of distinct content signatures among the calculated content signatures;
- forming the index graph database with the plurality of File URIs and the plurality of distinct content signatures;
- for each distinct content signature, identifying a plurality of non-text binary files among the list of non-text binary files, the content signature of each identified non-text binary file being equal to the respective distinct content signature, and linking the respective distinct content signatures with the File URIs of the identified non-text binary files;
- determining a weighted attribute for each distinct content signature based on at least one of an average downloading speed or a downloading count of the non-text binary files identified by the File URIs linked to the respective distinct content signature;
- ranking the plurality of content signatures according to the weighted attributes; and
- ranking at least a subset of the plurality of File URIs according to the ranked distinct content signatures.

15. The computer-readable medium of claim 14 having stored thereon additional instructions for causing at least one processor to perform the following:
- combining keywords associated with the non-text binary files linked with the distinct content signatures into a single set of keywords;
- storing the single set of keywords in the index graph database; and
- linking the respective distinct content signature with the single set of keywords.

* * * * *